(12) United States Patent
Tumwattana

(10) Patent No.: US 9,176,657 B2
(45) Date of Patent: Nov. 3, 2015

(54) GESTURE-BASED SELECTION AND MANIPULATION METHOD

(71) Applicant: Changwat Tumwattana, Hong Kong (HK)

(72) Inventor: Changwat Tumwattana, Hong Kong (HK)

( * ) Notice: Subject to any disclaimer, the term of this patent is extended or adjusted under 35 U.S.C. 154(b) by 229 days.

(21) Appl. No.: 14/027,186

(22) Filed: Sep. 14, 2013

(65) Prior Publication Data

US 2015/0082217 A1    Mar. 19, 2015

(51) Int. Cl.
*G06F 3/033*    (2013.01)
*G06F 3/0485*    (2013.01)
*G06F 3/0486*    (2013.01)

(52) U.S. Cl.
CPC ............ *G06F 3/0485* (2013.01); *G06F 3/0486* (2013.01)

(58) Field of Classification Search
CPC ..................................................... G06F 3/0485
USPC ......................................................... 715/863
See application file for complete search history.

(56) References Cited

U.S. PATENT DOCUMENTS

| 8,448,084 | B2 | 5/2013 | Brichter |
| 8,799,828 | B2 * | 8/2014 | Song ............................... 715/863 |
| 8,984,436 | B1 * | 3/2015 | Tseng et al. ................... 715/786 |
| 9,015,639 | B2 * | 4/2015 | Yoo et al. ....................... 715/863 |
| 9,024,895 | B2 * | 5/2015 | Yang et al. ..................... 345/173 |
| 9,043,733 | B2 * | 5/2015 | Chung et al. ................... 715/863 |
| 2011/0074830 | A1 | 3/2011 | Rapp et al. |
| 2013/0044141 | A1 | 2/2013 | Markiewicz et al. |

* cited by examiner

*Primary Examiner* — William Titcomb

(57) ABSTRACT

A method for selecting multiple content items in a list of content items is presented. In an embodiment, the method first displays a list of content items along the first direction on a display of the computing device. Then, the method detects a first portion of gesture for selecting a first content item in the list of content items. While the first content item is selected, the method detects a trigger for a second portion of the gesture, and then selects at least one second content item based on the second portion of the gesture. The trigger for the second portion of the gesture is a scroll gesture, and while the first content item is selected the scrolling of the list is disabled. A method for manipulating multiple content items in a list of content items is also presented.

14 Claims, 16 Drawing Sheets

GESTURE-BASED SELECTION AND MANIPULATION METHOD

FIELD OF INVENTION

The present invention relates to gesture-based operations in electronic devices with display, in particular gesture-based selection and manipulation methods on a list of selectable content items displayed on such devices.

BACKGROUND OF INVENTION

Many programs in computing devices such as personal computers or smart phones feature editable content items displayed in the form of a list. A lot of times, selection of such items has to be done individually for each item, such as by checking a checkbox or tapping on the item. Such selection methods are prone to errors in both user side and machine side, and are not reliable and convenient to use, especially when a large number of items are to be selected. Therefore a simpler and more intuitive method for selecting multiple items at a time is desired to improve the efficiency of the user interacting with the content items.

SUMMARY OF INVENTION

In light of the foregoing background, an aspect of the present invention is a method for selecting multiple content items in a list of scrollable content items. In an embodiment, the method first displays a list of content items scrollable along a first direction on a display of the computing device. Then, the method detects a first portion of gesture for selecting a first content item in the list of content items. While the first content item is selected, the method detects a trigger for a second portion of the gesture, and then selects at least one second content item based on a remainder of the second portion of the gesture. The trigger for the second portion of the gesture is a scroll gesture, and while the first content item is selected the scrolling of the list is disabled.

In an exemplary embodiment, the first portion of the gesture is a drag substantially orthogonal to the first direction, and in another exemplary embodiment the second portion of the gesture is a drag substantially parallel to the first direction. That means the first portion of the drag is substantially orthogonal to the second portion of the gesture.

In another aspect of the present invention, a method of manipulating a plurality of content items in a list of content items is presented. In an embodiment, the method first displays a list of content items along a first direction on a display of a computing device. A plurality of content items in the list of content items are selected, and each content item has a parameter value in a parameter field. The method then detects a multi-input gesture relative to the selected content items, and determines a direction and displacement of each input of the multi-input gesture. Based on the direction and displacement, the parameter values of the selected content item changes by an amount of change.

In different embodiments, the multi-input gesture can be a multiple drag gesture, a spread gesture or a pinch gesture. In different embodiments, the parameter values of the selected content items can shift by a same amount, or spread out or converge such that the parameter values of the content items changes in a way where a difference between adjacent content items increase or decrease across the selected content items.

This method of selection provides many advantages over the existing methods. First, the entire selection operation, regardless of the number of items to be selected, can be completed in one single motion of a single finger. This method is much more convenient than existing methods where content items has to be selected individually using one gesture for each content item. The selection is also intuitive to the user as the user only needs to drag his finger over the desired content items to select them.

The manipulating method of the present invention is also convenient for the user to change multiple parameter values at one time, such as times for reminders. This is especially useful in situations where sometimes the parameter values need to be changed relative to another content item.

BRIEF DESCRIPTION OF DRAWINGS

FIG. 1 is a block diagram showing a device where the method according to the present invention can be implemented in.

DETAILED DESCRIPTION OF EMBODIMENTS

Figure 1:
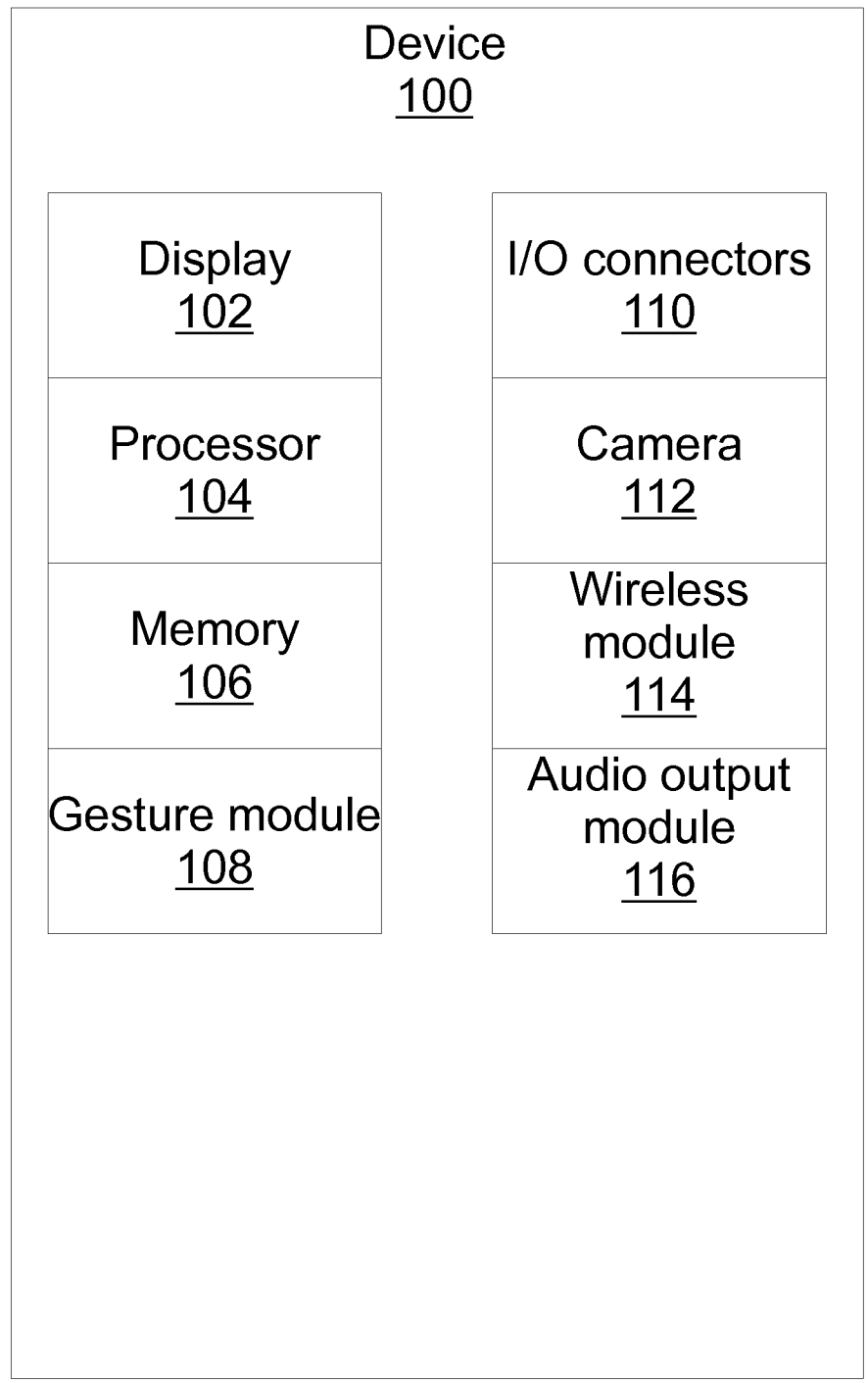

Embodiments of the present invention are described below using a computing device as example, such as one having the structure as shown in FIG. 1. The computing device (or device) 100 comprises a display 102, a processor 104, a memory 106, and a gesture module 108 that allows the device 100 to recognize gestures made by a user on its own or combining with other components. In an embodiment of the mobile device 100, the display 102 is a touch-sensitive display or touchscreen that is capable of detecting a user touching the display 102 by a finger, a stylus pen, or other appropriate devices. The gesture module 108 then analyzes the input to the display 102 to recognize the gesture made by the user. The touch-sensitive display can make use of resistive, capacitive, acoustic wave, infra-red, optical imaging or other technologies. In other embodiments, the gesture module 108 is connected to a sensing module not integrated into the display 102 for non-touch based gesture recognition.

In one embodiment, the processor 104 executes computer-readable instructions stored in memory 106, such as instructions that cause the method of the present invention to be performed. In different embodiments, the computing device 100 also comprises I/O connectors 110 for connecting to external devices such as an external sensing module, one or more cameras 112 for capturing images, a wireless communication module 114 for communication with other computing devices or a server, an audio output module 116 for providing audio output, etc.

Figure 2:
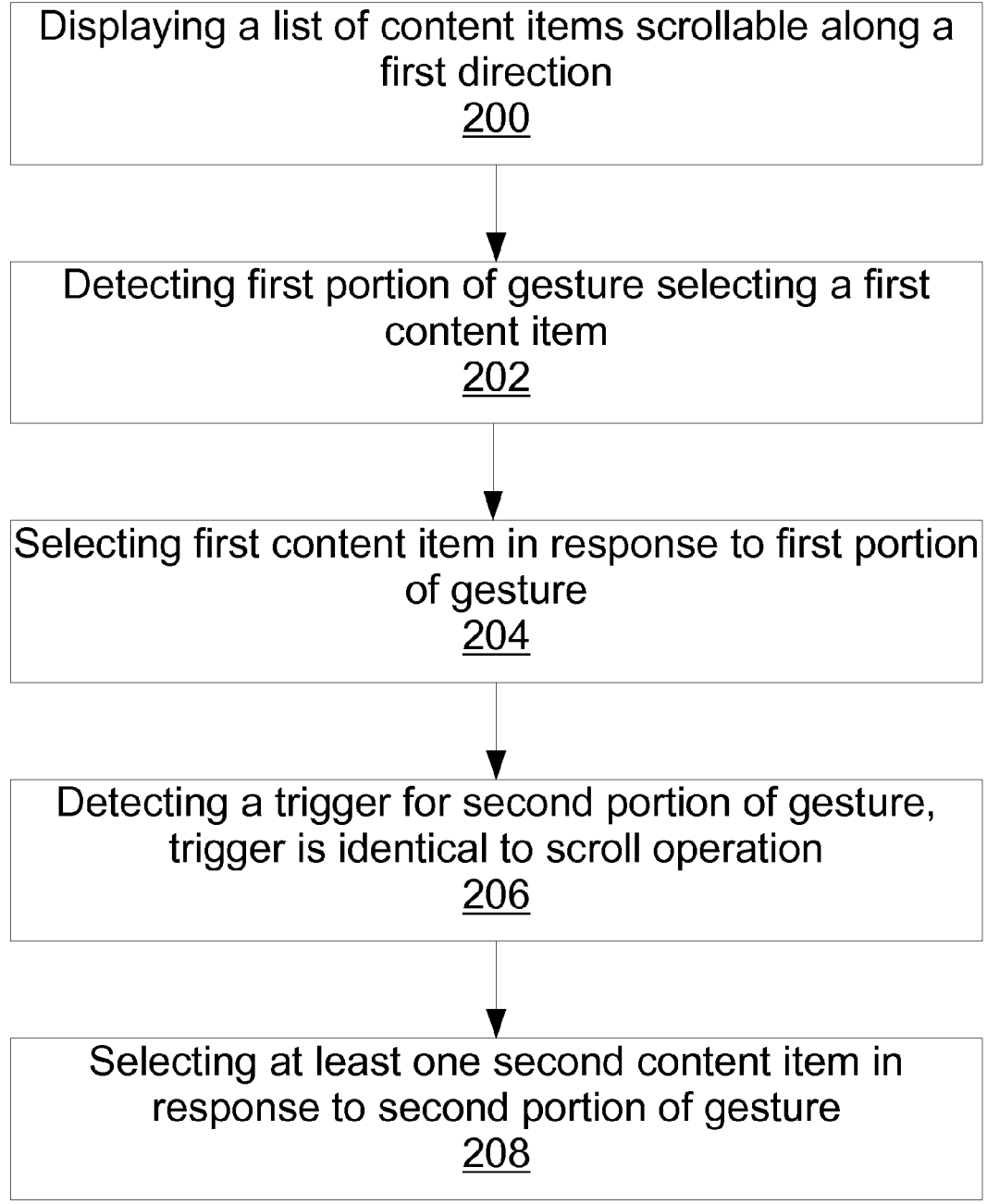
FIG. 2 is a flow diagram of a method for selecting multiple content items according to an embodiment of the present invention.

A first aspect of the present invention is a method for selecting multiple content items in a list of content items. An embodiment of such a method is illustrated in the flow chart as shown in FIG. 2. In step 200, the device displays a list of content items along a first direction such as vertical or horizontal. The content items could be text items, numerical expressions, audio clips, video clips, any other forms of content or a combination thereof as the program supports. Each content item is selectable by the user either individually or as a group.

In an exemplary embodiment, the list of content items is scrollable along the first direction, such as vertical (i.e. up-down). A scroll gesture or a scroll command, such as a single drag in the vertical direction, can be detected by the device to trigger the scroll operation, resulting in some previously undisplayed content items to be displayed on the display screen for example. In a further embodiment, the list of content items is scrollable only along the first direction but not in other directions.

In step 202, the device detects a first portion of a gesture by the user selecting a first content item in the list. For a touch-sensitive display as described above, the gesture is detected by sensing a finger contact on a location corresponding to the first content item, usually right on top of the first content item, or in specifically designated areas on the display screen. For other devices, the location can be a location proximate the first content item, or the finger can be at a point in space that is determined to be pointing at the corresponding location.

In an exemplary embodiment, the first portion of the gesture is a single-finger drag initiated on the first content item and running substantially orthogonal to the first direction. This configuration minimizes the possibility that the select operation being mistaken as a scroll operation, which is a single-finger drag along or substantially parallel to the first direction. In an exemplary embodiment, this gesture is identical to the gesture for selecting a single content item, which means that only the first content item is selected if the gesture is concluded after the first portion, which means that the gesture for selecting multiple content items is an extension of the gesture for selecting a single content item. This feature makes the selection process more intuitive to the user and simplifies the operation of the program.

In various other embodiments, the first portion of the gesture can be multi-finger drag running substantially orthogonal to the first direction, or a single tap, a double tap, a tap-and-hold etc, so long as the first portion of the gesture can be distinguished from a scroll gesture. However, it is more preferred that the select operation is quick and can be performed using a single finger so as to be easily performed while holding the computing device in a hand.

In step 204, the device selects the first content item in response to detecting the first portion of the gesture. In an exemplary embodiment, a buffer is set by the device such that the first content item is deemed selected only if the drag distance or displacement exceeds the buffer. The buffer can be set at around a quarter of the width of the screen or a fixed number of pixels. In various embodiments, the selection of the first content item is indicated to the user by highlighting the selected content item using another color in all or part of the content item, or by shifting the selected content item relative to unselected content items, or by playing a sound effect, or by vibration of the device, or displaying a check mark, or a combination of the above.

While the first content item is selected, in step 206, the device detects a trigger for the second portion of the gesture. It is noted that the finger is not released from the display between the first portion and the second portion of the gesture, meaning that the device regards the two portions of the gesture as a single gesture but not separate gestures, even different portions of the gesture may instruct the device to perform multiple operations. In different embodiments, the device may allow or deny a pause between the first and second portions.

In an exemplary embodiment, the trigger for the second portion of the gesture is identical to a scroll gesture or scroll command along the first direction. In one embodiment, the scroll gesture along the first direction is determined as a drag where the component along the first direction is larger than or equal to the component orthogonal to the first direction. While the first content item is selected and the gesture is not yet completed or concluded, scrolling of the list along the first direction is disabled so the list of content items will stay at the original location, allowing the finger to move over and select at least one second content item, as explained in more detail below.

In step 208, the device selects the at least one second content item based on the second portion of the gesture. In one embodiment, the device first determines whether a next or adjacent second content item in the direction of the second portion of the gesture is present. If present, then the next second content item is determined to be selected when the device determines that the finger moves over to the next second content item. In different embodiments, whether the finger has moved over to the next second content item can be determined by the distance moved along the first direction, or by comparing the present location of the finger and the area occupied by each second content item. For example, when the distance moved is approximately the same as the height of a content item, it is very likely that the finger has moved from one content item to the next content item. Alternatively, when the finger crosses a certain point on the display that is occupied by one content item, the device can also deduce that the finger moves over to the next content item. In one embodiment, a buffer is also employed for the selection of the next second content item. For example, the buffer can be set such as the point of contact is a certain pixels over the boundary of the content item so as to prevent accidental selection of the next item.

In an alternative embodiment, a matrix or table of content items is scrollable in more than one direction, and scrolling in all directions are disabled during a gesture once the first content item is selected. The selection of the first content item can be by a double tap or other gestures that can be distinguished from a scroll gesture for any of the directions.

In another alternative embodiment, the scrolling of the list of content items is disabled when the device detects that the first content item is selected, but is reenabled as the second portion of the gestures reaches an edge of the display screen. This allows the user to select more content items than those displayed in a single gesture.

In an exemplary embodiment, a specific second content item is selected immediately when the second portion of the gesture is determined to move over the content item. In another embodiment, the device detects the gesture is concluded before determining the ending location of the finger, and then selects all content items between the first content item and the one at the ending location simultaneously. In both cases, a continuous sublist of content items is selected by the operation.

Figure 3A:
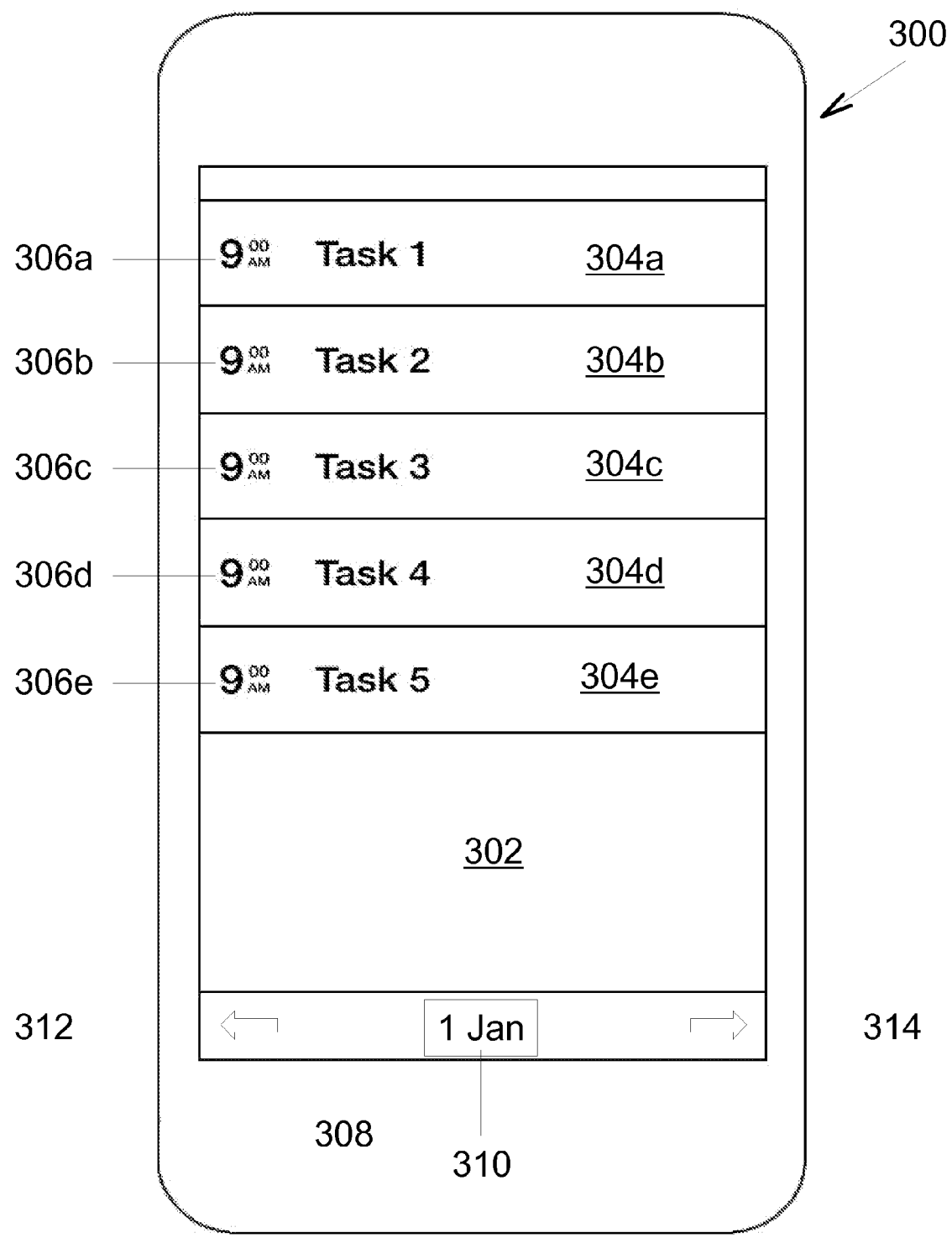
FIGS. 3a-3c illustrates a mobile device in a method for selecting multiple content items according to an embodiment of the present invention.
Figure 3B:
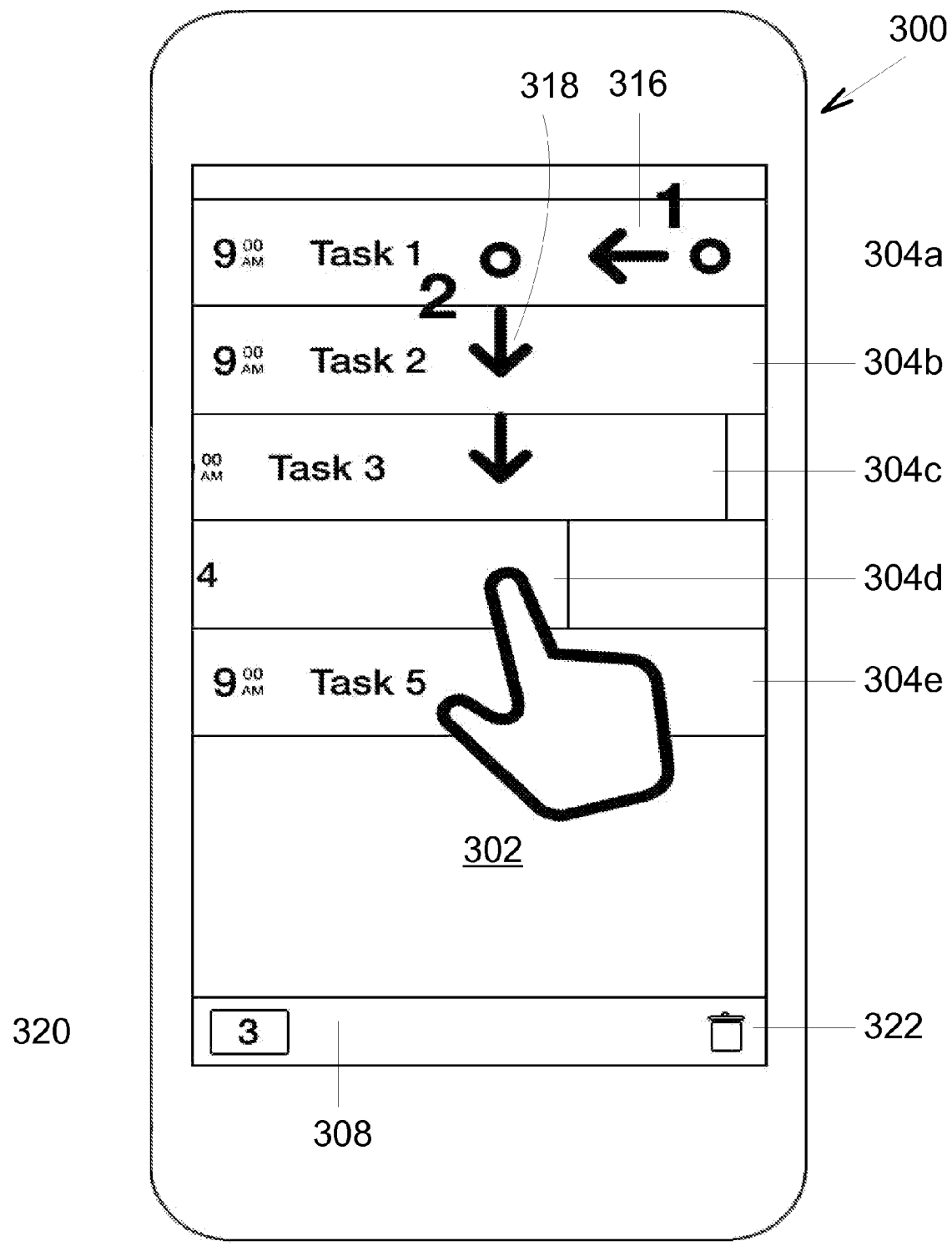
Figure 3C:
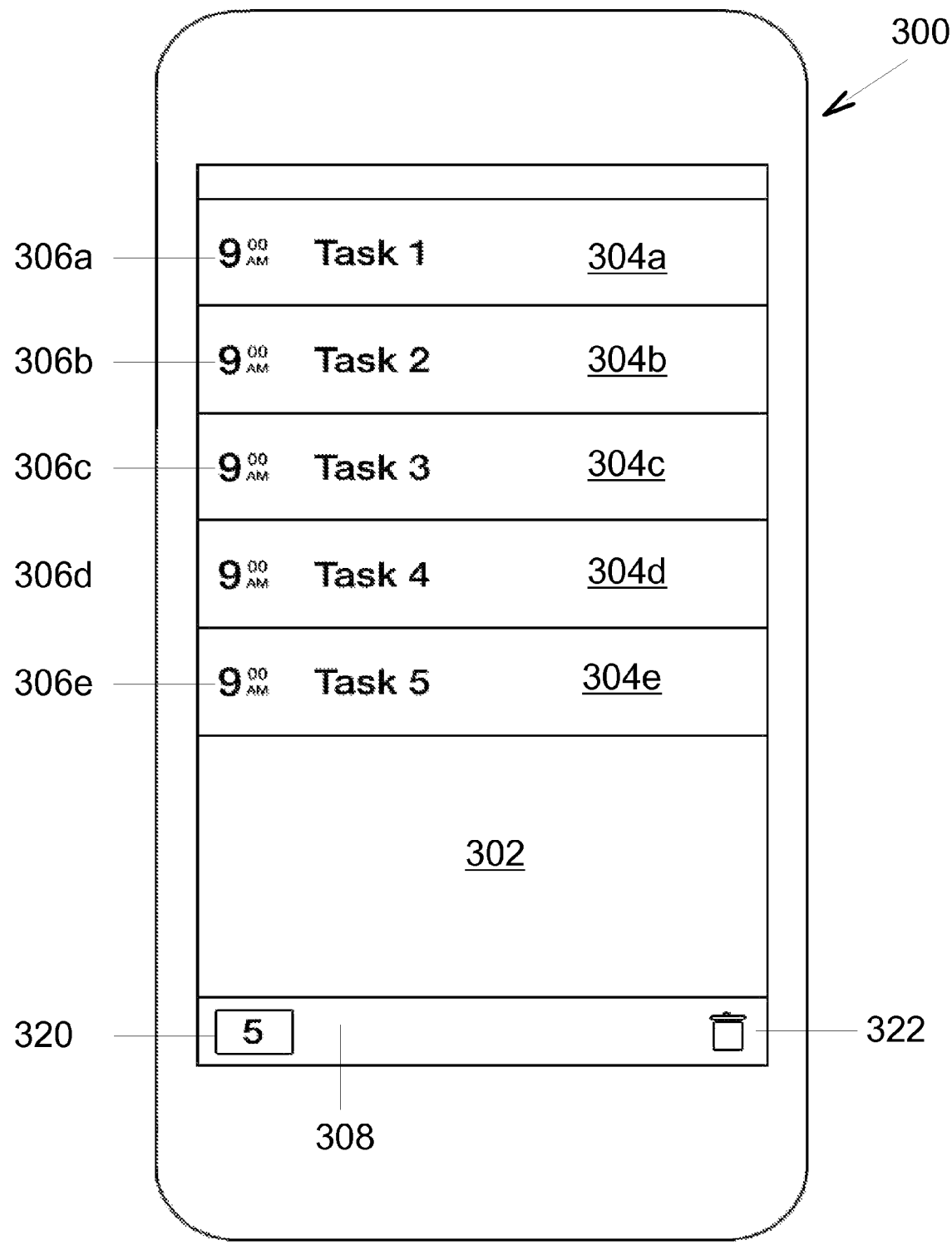

FIG. 3a-3c shows an implementation of the above method in a scheduling app. In FIG. 3a, which is the state before the method starts, device 300 is shown as a smart phone with a touch screen display 302. A list of five content items 304a-304e is displayed along a vertical direction. Each content item 304a-304e comprises a task description (e.g. Task 1) and a time 306a-306e associated to the task description, which are both editable by a user. The content items 304a-304e in the list can be sorted in a chronological order based on the times 306 associated to the task descriptions. A menu bar 308 is displayed at the bottom of the display 302, with a date 310 of the tasks displayed at the center thereof. A left button 312 and a right button 314 are also displayed at the two sides of the date 310 to allow the user to switch to tasks for another date. In one embodiment, an option button (not shown) is displayed instead of the left button 312 to allow the user to configure the settings of the app.

In an exemplary embodiment, the menu bar 308 is a pull-up menu where a calendar is displayed when pulled up. The calendar allows the user to directly switch to a particular date to edit or check the tasks on that date.

In FIG. 3b, the device 300 detects a user selecting a first content item 304a by detecting a first portion of a drag, denoted by arrow 316, at the first content item 304a in a direction substantially orthogonal to the direction of the list, which in this case is horizontal. The direction of drag is shown as left in this figure, but it is understood that a drag to the right can achieve the same effect. Once the distance of the drag exceeds the buffer, which for example can be around a quarter to a half of the width of the screen, the first content item 304a is selected, which can be indicated to the user using visual indications and/or audio indications as mentioned above. In this embodiment, the first content item 304a follows the movement of the finger so the first content item 304a will shift to the left when the drag is to the left.

The device 300 then detects the trigger for the second portion of the gesture, which is a drag that runs downwards, denoted by arrow 318, and travelling over content items 304b, 304c and 304d. When the drag moves overs a content item, the device 300 selects the content item along with the first content item 304a. In an exemplary embodiment, the indication of a content item being selected during the second portion of the gesture is identical to that during the first portion of the gesture. That means content items 304b, 304c and 304d are highlighted with the same color and shifted in the same direction as the first content item 304a. Once the finger moves over to another content item, the previously selected content item will return to its original position. It can be seen in FIG. 3B that content item 304b is already fully returned to its original position while content item 304c is still returning to its original position. Content item 304d shows that the currently selected content item is shifted to the same direction as the first portion of the gesture.

In another embodiment, while the visual indication is the same for all content items, different audio indications can be different for each content item selected. In a specific example, a pitch of the audio indication can change for each content item selected along the list. The pitch can be set such that it follows a major chord or a specific sequence, behaving as if each content item is a key for a musical instrument like a piano.

While the drag is continuing, the information displayed in the menu bar 308 changes. The date 310 is still displayed at the center of the menu bar 308, but at the left of the menu bar 308 is a box 320 showing the number of content items selected. In this embodiment, three content items (304a, 304b and 304c) are deemed as selected, while the selection of content item 304d will only be reflected either when the finger moves to the next content item 304e, or releases from the display. After the selection gesture is concluded, tapping this box 320 will unselect all selected content items simultaneously. A recycle bin icon 322 is also displayed at the right side of the date 310. After the dragging is concluded and the selected content items are finalized, the selected content items can be deleted by the user interacting with the recycle bin icon 322, such as tapping the recycle bin icon 322.

Referring to FIG. 3C, it can be seen that all five content items 304a-304e are selected, as indicated by the number "5" shown in the box 320 in the left hand side of the menu bar 308.

Figure 4:
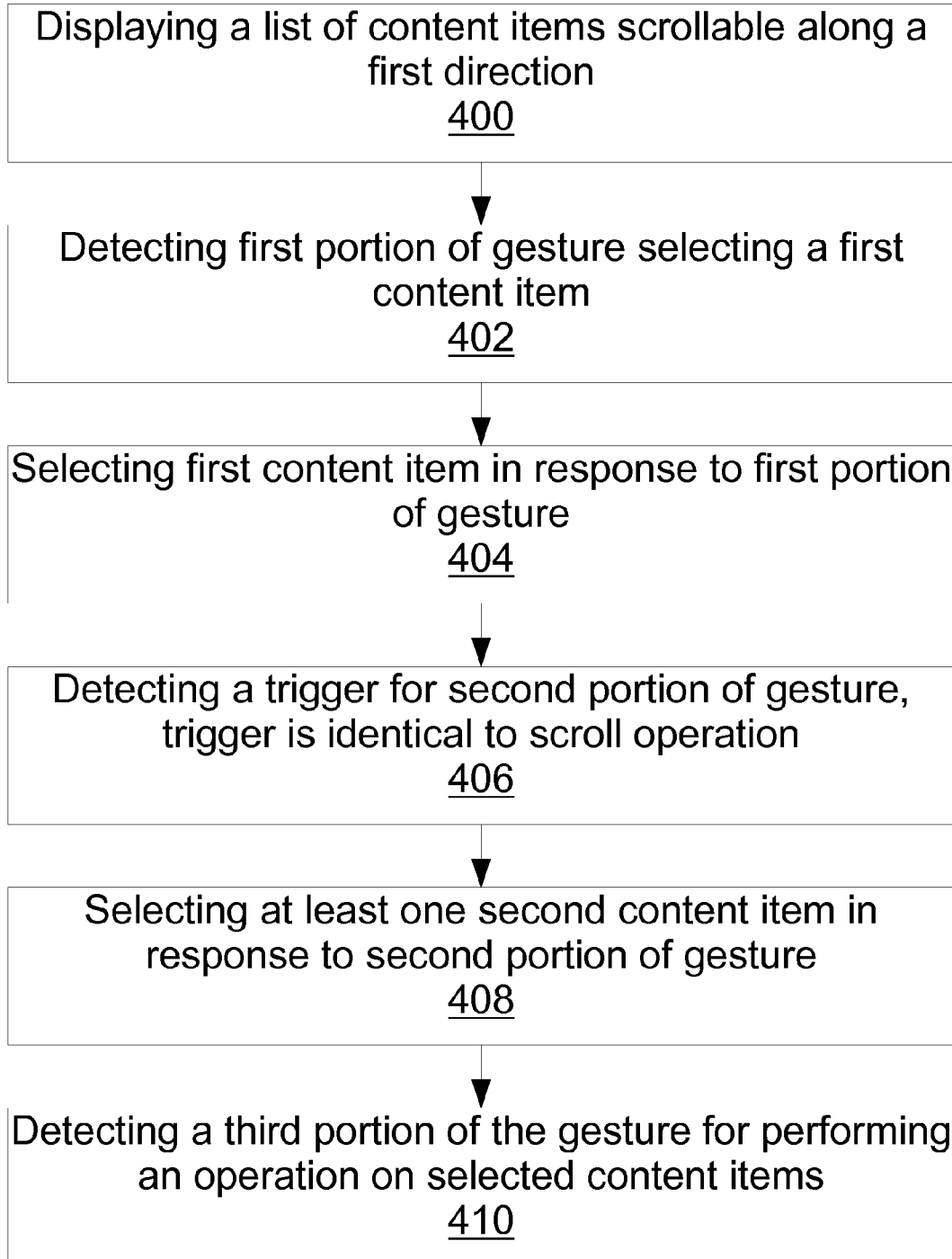
FIG. 4 is a flow diagram of a method for selecting and manipulating multiple content items according to an embodiment of the present invention.

In another embodiment as shown in FIG. 4, the device further detects a third portion of the gesture. Steps 400-408 are identical to steps 200-208 as described above. In step 410, the device detects a third portion of the gesture for performing an operation on the selected content items. In an exemplary embodiment, the second portion of the gesture is entirely a drag substantially parallel to the first direction so that the device can distinguish the third portion of the gesture from the second portion of the gesture by their directionalities. In a further embodiment, the third portion of the gesture has a same directionality than the first portion of the gesture.

Using the example in FIG. 3 above, the third portion of the gesture can be a dragging gesture along the horizontal direction in an embodiment, which is substantially orthogonal to the direction of the list. The third portion can be the in the same or opposite direction as the first portion, and the operation can be deletion of the content items (same as the function of the recycle bin icon 322), highlighting the content items for indicating different levels of importance or priority, grouping the content items together for group editing purposes, or other operations. In another embodiment, the third portion of the gesture is a dragging gesture that starts in the horizontal direction but has a complex trajectory like a circle, a star or a Z-shape, etc. The start in the horizontal direction is needed for distinguishing the third portion from the second portion, and the complex trajectory can increase the number of operations a user can do to the content items using a single motion.

In another embodiment, the third portion of the gesture involves another finger than the one used in the first portion and the second portion of the gesture. For example, when the first portion and the second portion of the gesture is a dragging gesture using a first finger, the third portion of the gesture can be a tap using a second finger, while the first finger is still held at the position of the second content item so that the device detects that the gesture is still not concluded.

If the content items are arranged in a way such that they are completely aligned, such as the arrangement in FIG. 3a, the second portion of the gesture would result in a continuous sublist of content items being selected. In an alternative embodiment, the list of content items has an offset in their horizontal locations, such that the finger can move over some of the content items without crossing over others, allowing the user to select multiple content items that are not necessarily adjacent to each other in one single gesture. In another embodiment, after the content items are selected, individual selected content items can be deselected using operations similar to selecting an individual content item in order to have the desired content items be selected only. Multiple content items can also be deselected by following the same steps as explained above for selecting the content items.

In another embodiment, while the second portion of the gesture is in progress, backtracking of the gesture, or in other words, having the gesture move in an opposite direction to the direction of selection would result in unselection of a selected content item. For example, if the second portion of the gesture is a downward drag, then a upward drag over a content item would unselect the content item.

Figure 5:
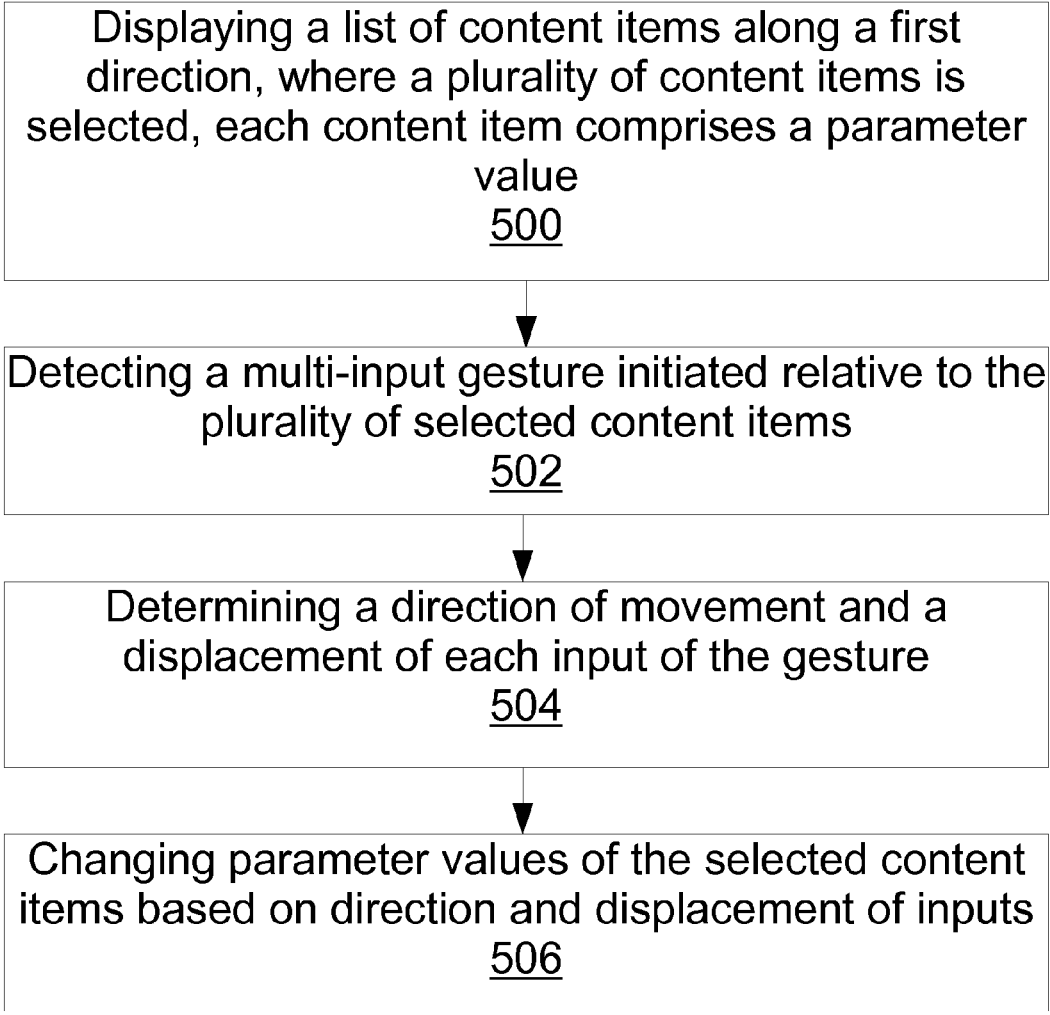
FIG. 5 is a flow diagram of a method for manipulating multiple content items according to an embodiment of the present invention.

FIG. 5 shows a method of editing or manipulating the content items after they are selected, according to an embodiment of the present invention. In step 500, the device displays a list of content items on its display along a first direction, with a plurality of content items in the list being selected. Each content item has a parameter field having a parameter value associated thereto, where the parameter values of the content items are sortable and can be manipulated using alphanumerical operations. Examples of the parameter field include numerals (e.g. 1, 2, 3 . . . ), alphabets (e.g. A, b, c . . . or i, ii, iii . . . ), time (9:00, 10:00, 11:00 . . . ) or other parameter types. The selected content items can be in a continuous list or can be discrete content items. The method of selection can be a method as described above or a conventional selection method, as long as the appropriate content items are selected.

In step 502, the device detects a multi-input gesture being initiated relative to the selected content items. For the purposes of this invention, a multi-input gesture is a gesture where the movements of more than one input is interpreted together by the device as a single gesture. In various embodiments, the multi-input gesture can be initiated anywhere on the selected content items, on a specific selected content item among the selected content items, on the time parameter of the content items, or anywhere on the display screen. The location of initiation can be determined by the location of one of the fingers, or a mid-point of the multiple fingers.

In step 504, the device determines a direction of movement and a displacement of each input of the multi-input gesture. In different embodiments, the directions of movement of the multiple inputs can be substantially parallel, substantially opposite, extending radially outwards or inwards, or rotating in a clockwise or counterclockwise direction. The displacement can be determined by a total distance moved, a net distance moved along a specified direction such as along the first direction, or an angle of rotation.

In step 506, the device changes the parameter values of the content items by an amount of change based on the direction and displacement of each input of the multi-input gesture. In an exemplary embodiment, the direction of each input determines the operation type and therefore how the parameter values should be changed, such as which expression should be used to calculate the amounts of change. In another exemplary embodiment, the magnitude of the amount of change is generally proportional to the displacement of the inputs.

Figure 6A:
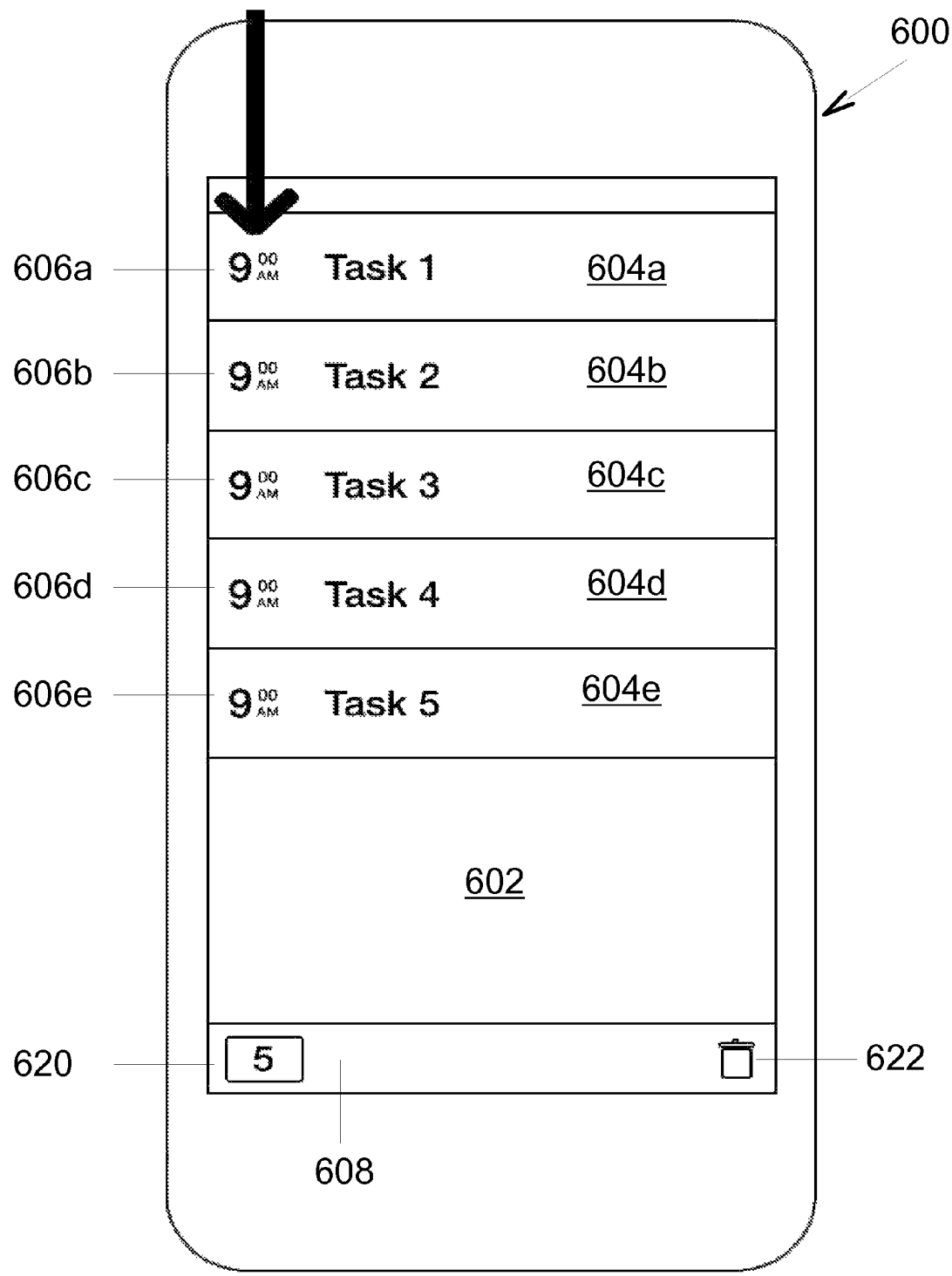
FIG. 6a-6b illustrates a mobile device in a method for manipulating multiple content items according to an embodiment of the present invention.
Figure 6B:
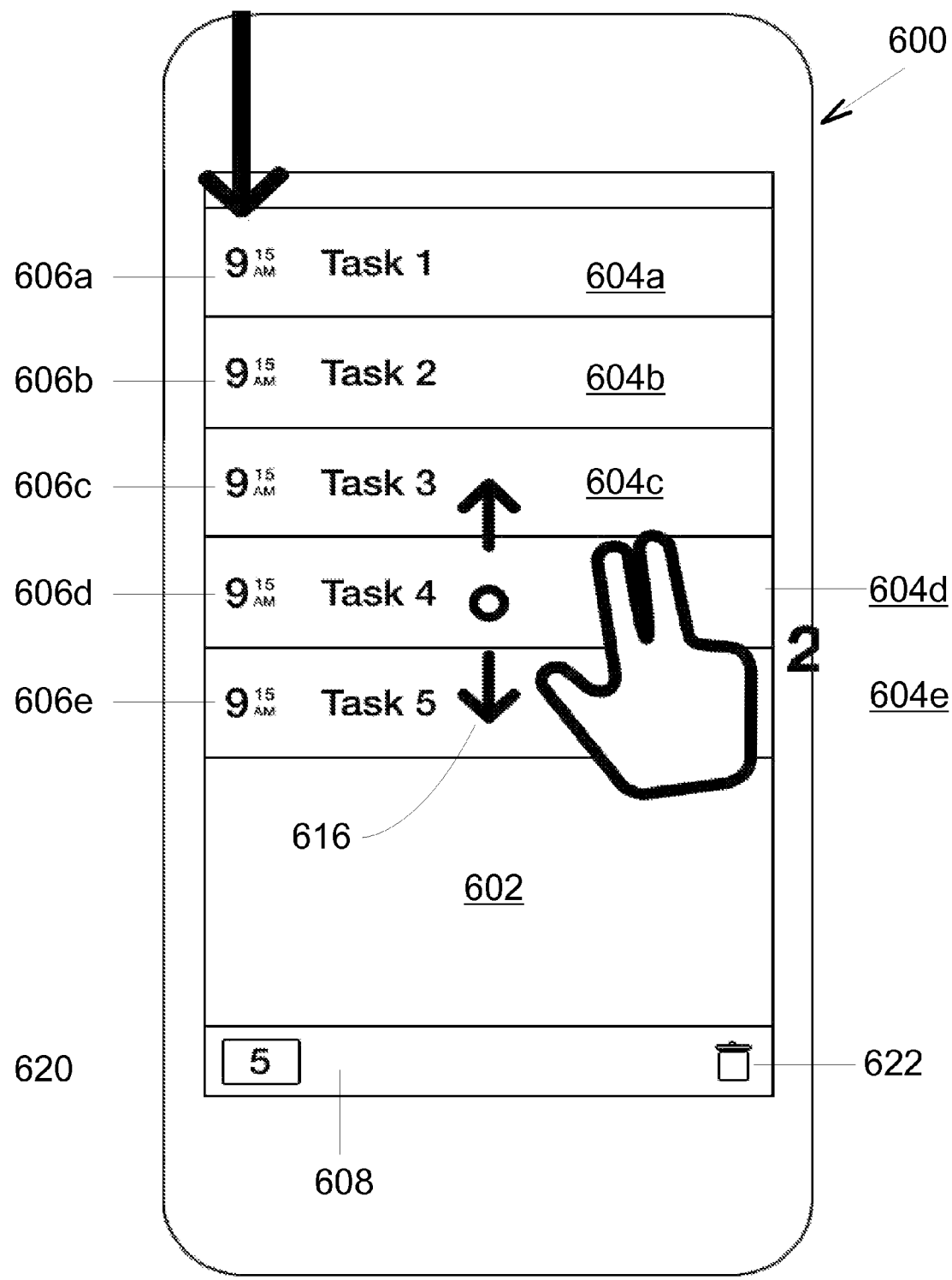
Figure 7:
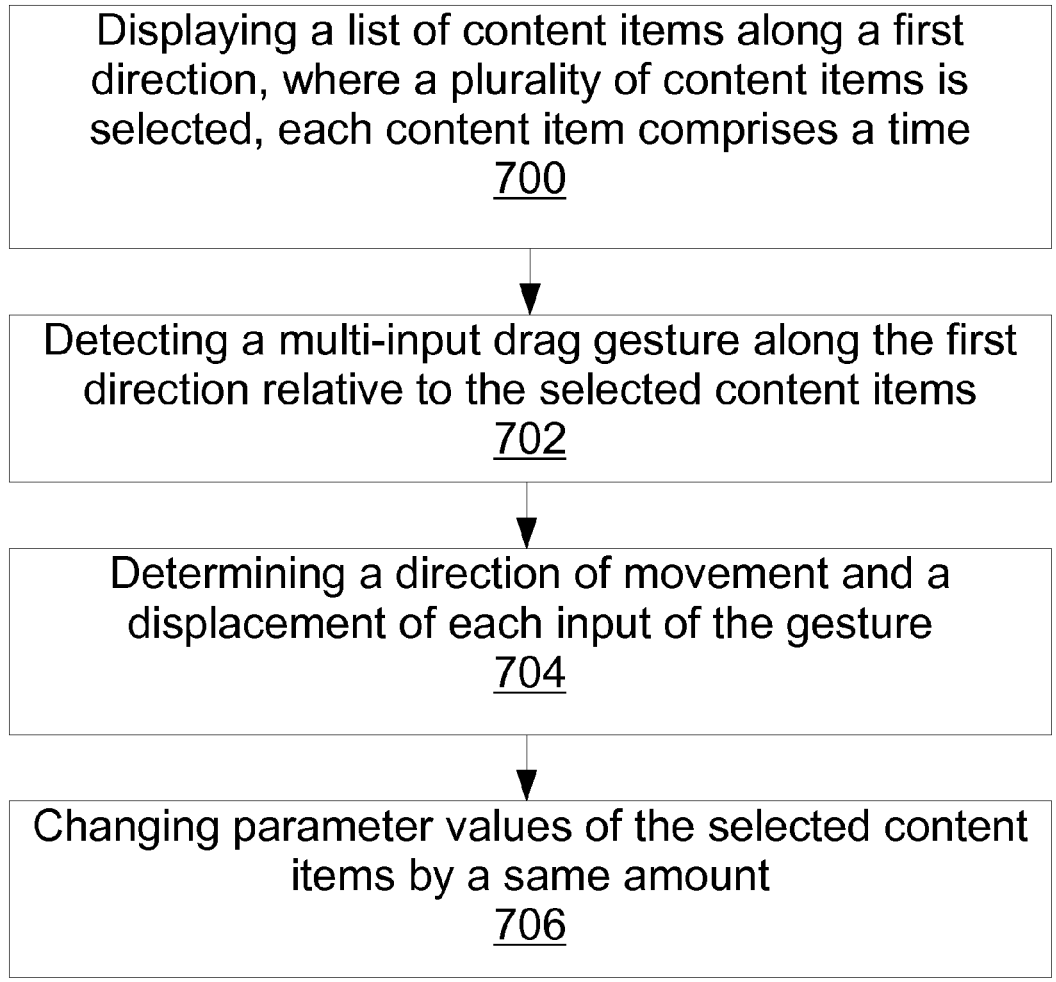
FIG. 7 is a flow diagram of a method for manipulating multiple content items according to an embodiment of the present invention.

FIGS. 6 and 7 show a specific example of the method described above, according to an embodiment of the present invention. In step 700, the device displays a list of content items along the first direction, with a plurality of content items 604a-604e selected as shown in FIG. 6a. Each content item 604a-604e has a task description and also a parameter field having a parameter value 606a-606e. In this specific embodiment, the parameter is shown as a time. As shown in FIG. 6A, the times 606a-606e are all displayed as 9:00 am. The menu bar 608 has a box 620 for indicating the number of content items selected and a recycle box icon 622 for deleting the content items. As indicated by the number "5" in the box 620, all five content items are selected in FIG. 6a.

In step 702, the device detects a multi-finger drag gesture along the first direction relative to the selected content items. A multi-finger drag gesture is defined as more than one finger dragging in a substantially same direction. In step 704, a direction and a displacement of each finger of the multi-finger drag gesture is determined. When the first direction is vertical, the direction of the drag can be up or down, as shown by the arrow 616 in FIG. 6b. The displacement can be determined by an average displacement of the fingers either upwards or downwards.

In step 706, based on the direction and the displacement of each input of the multi-finger drag gesture, the device shifts the times 606a-606e by a same amount. When the drag is downwards, the parameter will increase in value, or in this case, the time is delayed. As shown in FIG. 6B, the times 606a-606e (9:15 a.m.) are shifted from the times in FIG. 6A (9:00 a.m.) by 15 minutes. On the other hand, when the drag is upwards, the times will shift forward. The relationship of the directions of drag and time shift can be changed according to user needs.

In an exemplary embodiment, the amount of change is generally directly proportional to the displacement. That means doubling the displacement would also double the amount of change of the parameter values and vice versa. In another exemplary embodiment, the parameter value 606a-606e increments or decrements in predetermined intervals. For example, in FIG. 6 the interval is set as 5 mintues, 15 minutes, or 1 hour. In various embodiments, the interval is adjustable by a user by a gesture or by configuring the settings before the gesture. Assuming the interval in this example is 15 minutes, FIG. 6B shows that the times 606a-606e is shifted by one interval. If the drag continues and the displacement continues to increase, the times 606a-606e will then change to 9:30 a.m., then 9:45 a.m., until the gesture is completed.

In an alternative embodiment, the amount of change of the parameter values are further dependent on a hold duration of the gesture. By holding the gesture for a period of time, the amount of change can be increased even if space is limited therefore preventing the displacement to further increase. In a further embodiment, the amount of change only start depending on the hold duration when the fingers already reach the edge of the display.

Figure 8A:
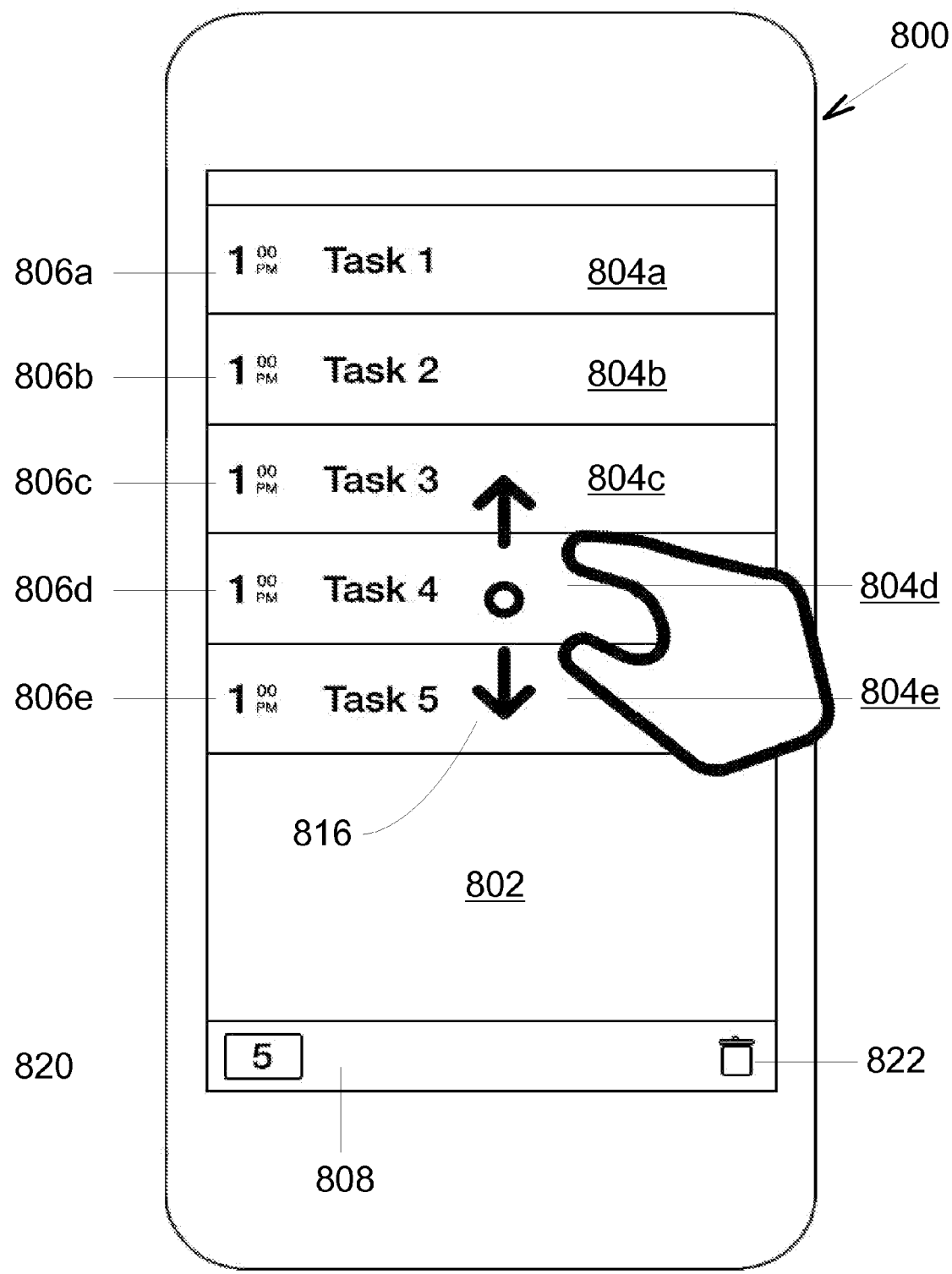
FIG. 8a-8b illustrates a mobile device in another method for manipulating multiple content items according to an embodiment of the present invention.
Figure 8B:
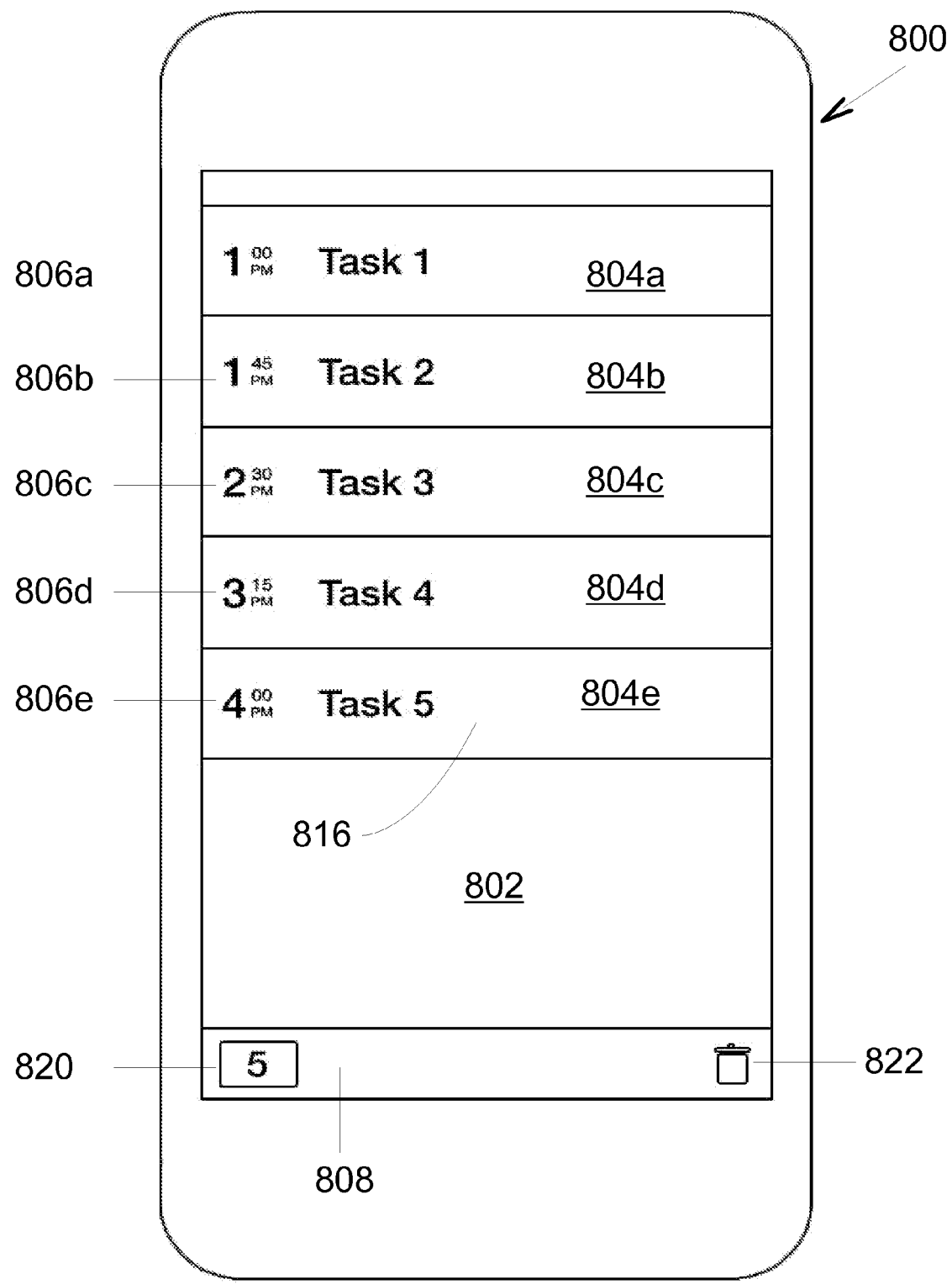
Figure 9:
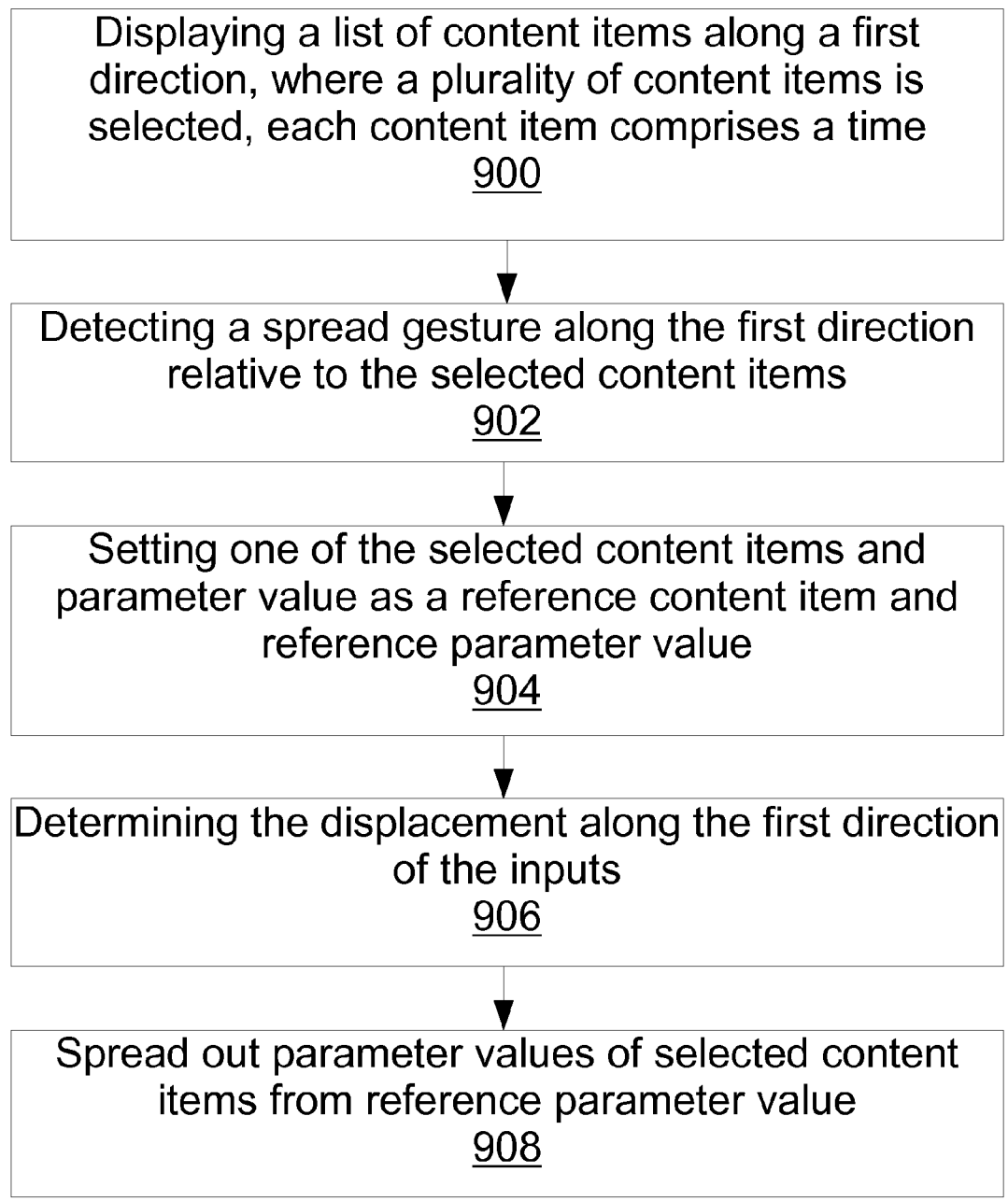
FIG. 9 is a flow diagram of a method of manipulating multiple content items according to another embodiment of the present invention.

FIGS. 8 and 9 describe another method of manipulating the content items according to an embodiment of the present invention. In step 900, the device 800 displays a list of content items along the first direction, with a plurality of content items 604a-604e selected as shown in FIG. 8A, same as that in FIG. 6A of the previous example. In step 902, the device detects a spread gesture along the first direction relative to the selected content items. Then, in step 904, the device sets one of the selected content items as a reference content item, and the parameter value of the reference content item becomes a reference parameter value. In different embodiments, the reference content item is determined by the location of initiation of the gesture, such as by one of the fingers or the mid-point of the fingers. In another embodiment, the reference content item is determined as the first or topmost content item among the selected content items (i.e. 804a), and independent to the location of initiation of the gesture, or it can be the last or most recently selected content item.

In step 906, the device determines the displacement of the inputs along the first direction, similar to the example above. In step 908, the device spreads out the parameter values of the selected content items 806b-806e from the reference parameter value 806a, which means that the parameter values 806b-806e moves away from the reference parameter value 806a and the amount of change of the parameter value for each selected content item increases from the last content item. In an exemplary embodiment, the reference parameter value 806*a* stays unchanged, and the parameter value of the selected content items changes in a way that a difference between adjacent content items increases across the selected content items. As seen in FIG. 8B, the reference parameter value 806*a* stays at 1:00 pm. The parameter values 806*b*-806*e* is changed such that there is a difference of 45 minutes between adjacent content items, i.e. 1:45 pm, 2:30 pm, 3:15 pm and 4:00 pm. If the displacement of the drag increases such that the difference is determined to be 1 hour, the parameter values 806*b*-806*e* will become 2:00 pm, 3:00 pm, 4:00 pm and 5:00 pm.

In an alternative embodiment, the reference content item is determined by the location of initiation, such as 804*d* in FIG. 8*a*. In such case, upon detecting the spread gesture, the time 804*e* will be pushed back from time 804*d* (e.g. from 1:00 p.m. To 1:45 p.m.), but times 804*a*-804*c* will be pushed forward from time 804*d* (e.g. from 1:00 p.m. To 12:15 p.m. Etc.)

Figure 10A:
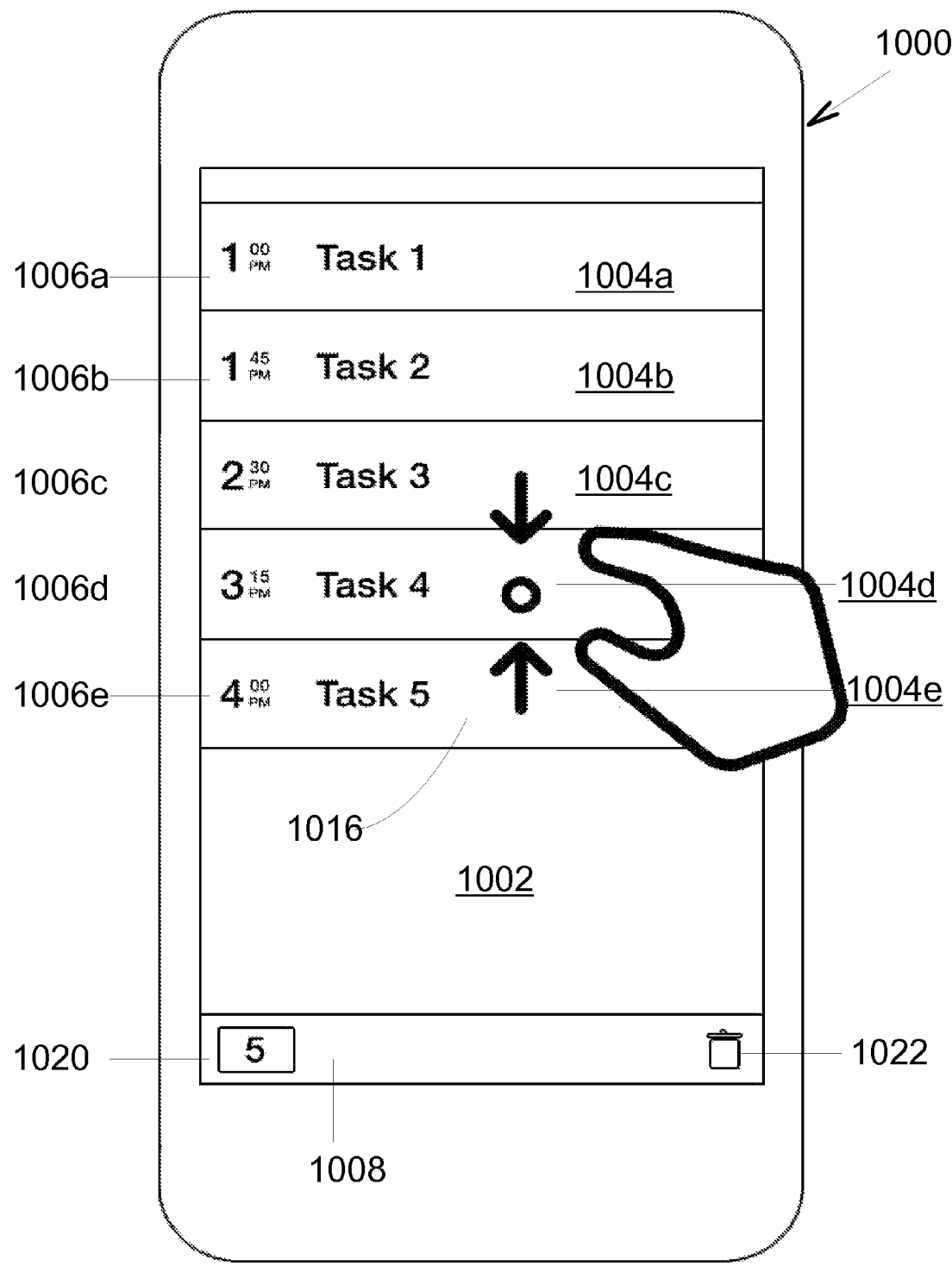
FIG. 10a-10b illustrates a mobile device in a method for manipulating multiple content items according to an embodiment of the present invention.
Figure 10B:
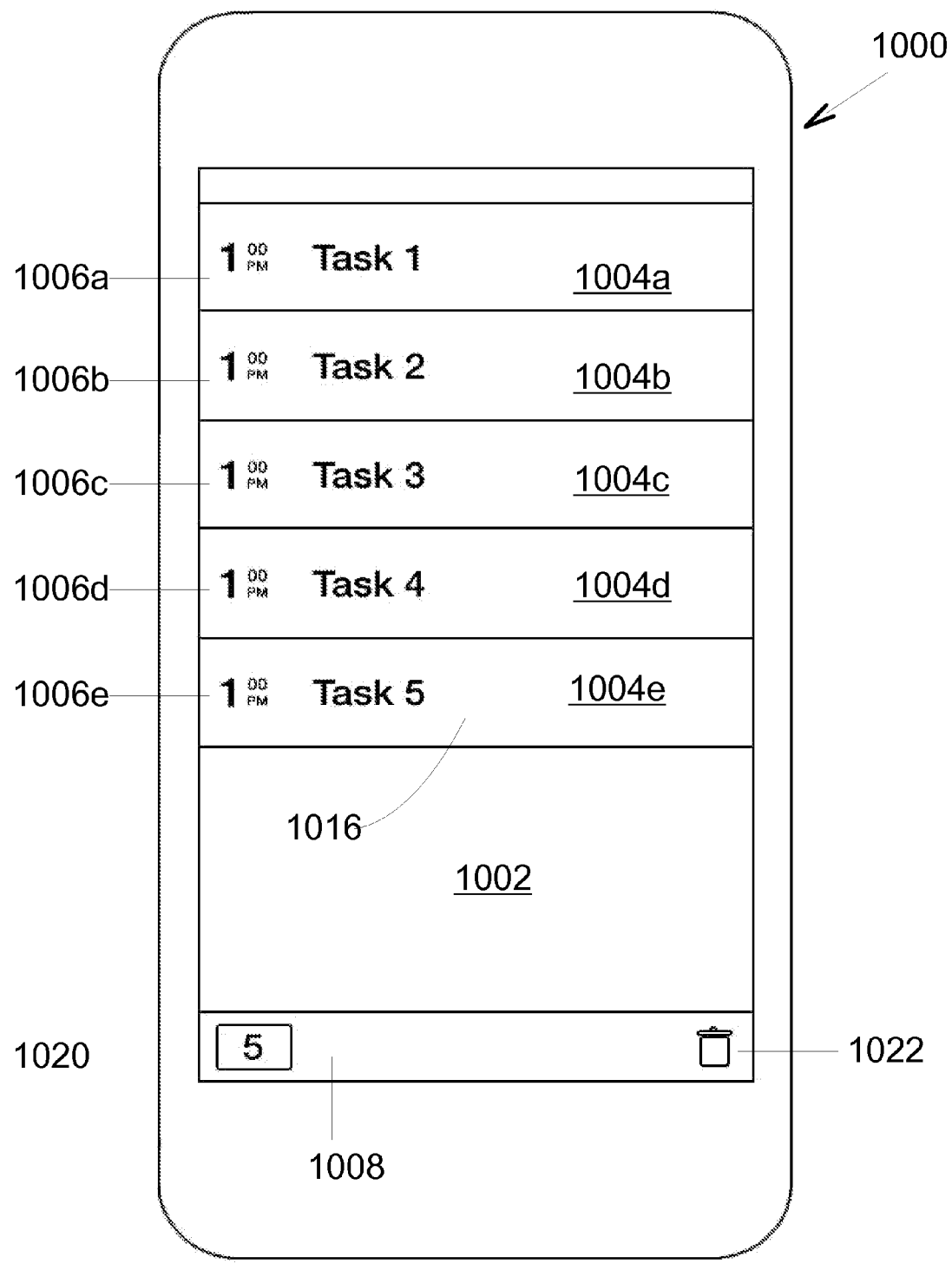
Figure 11:
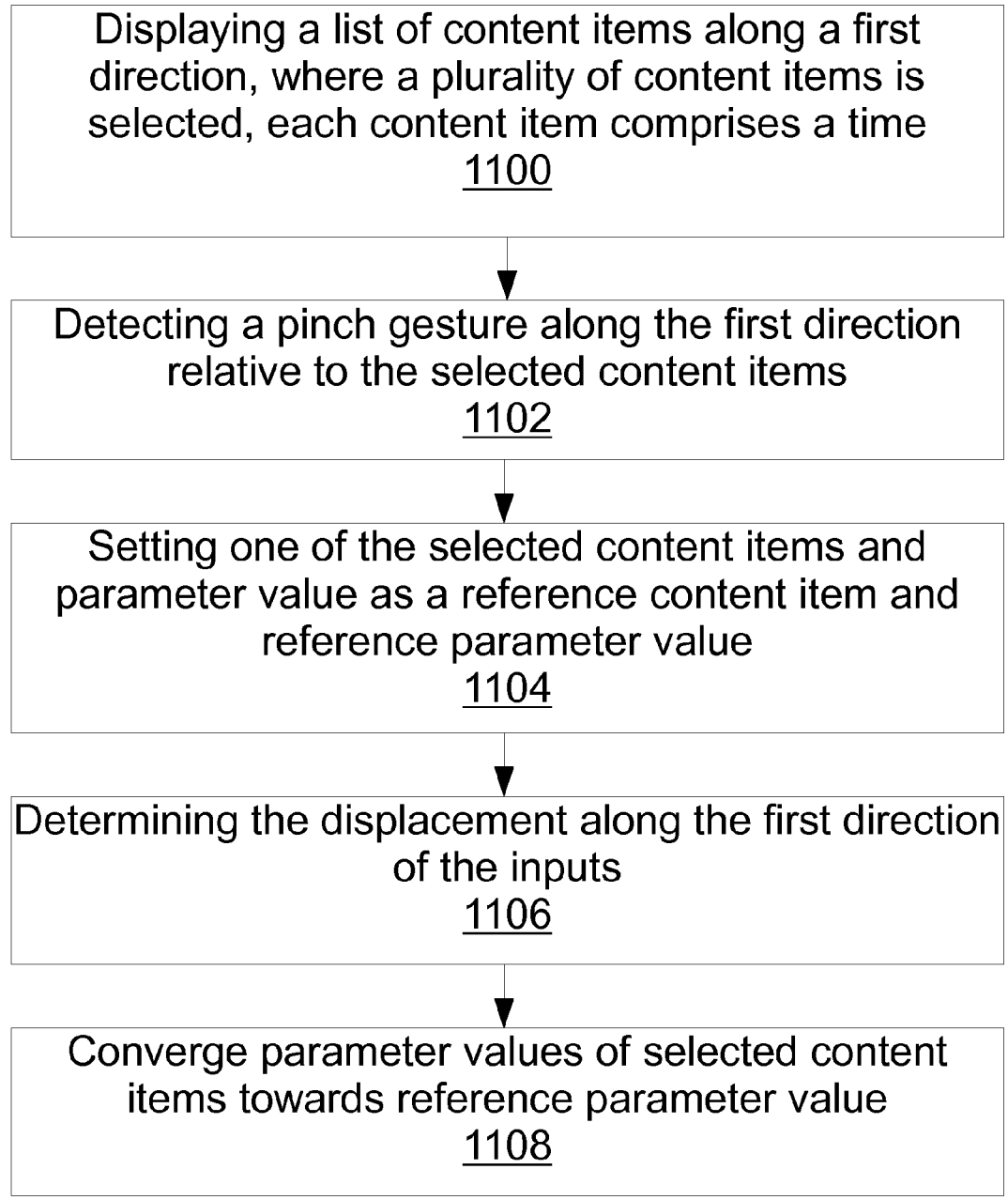
FIG. 11 is a flow diagram of a method of manipulating multiple content items according to another embodiment of the present invention.

Another method of manipulating content items according to the present invention is described in FIGS. 10 and 11. In this method, the gesture is a pinch gesture, and the change of parameter value is basically a reverse of the above embodiment. The parameter values of the selected content items will converge towards the parameter value of the reference content item, as seen in FIG. 10*b*.

The embodiments of the present invention are fully described above. Although the invention is illustrated in specific embodiments, one skilled in the art would understand that variations and modifications can be made in the details of the implementation without departing from the scope and spirit of the invention. The scope of invention will be construed by the claims below.

For example, the interval can be adjusted by the user. In one embodiment, the gesture for manipulating the parameter values is preceded by a drag orthogonal to the first direction. The distance of the orthogonal drag can be used to determine the interval in the gesture that follows. The current selected interval can be displayed to the user as the drag is in progress.

In another embodiment, the interval is dependent on the number of inputs of the multi-input gesture. For example, a two-finger gesture will result in a smaller interval than a three-finger gesture.

In one embodiment, a limit is set for the parameter values so that when the parameter values are changed using a method described above, the parameter values cannot move over the limit. For example, limits can be set at the beginning of the day and the end of the day, or in pinch gestures, the time of the reference content item.

In one embodiment, the time shift operation can be operated with one input. In an exemplary embodiment, the method detects a single input at a specific area of the content item, for example on the time of the content item. The movement of the finger along the first direction will shift the time of all selected content items by a same amount. In a further embodiment, the interval of the time shift can be adjusted by the user by detecting the finger dragging orthogonal to the first direction by a predetermined distance before moving along the first direction.

What is claimed is:

1. A method comprising:
    displaying a list of content items scrollable along a first direction on a display of a computing device;
    detecting a first portion of a gesture selecting a first content item in said list of content items;
    while said first content item is selected, detecting a trigger for a second portion of said gesture; and
    selecting at least one second content item in said list of content items in response to said second portion of said gesture;
    wherein said trigger for said second portion of said gesture is a scroll gesture along said first direction, and wherein scrolling of said list of content items is disabled while said first content item is selected.

2. The method according to claim 1, wherein said first portion of said gesture is a drag in a direction substantially orthogonal to said first direction.

3. The method according to claim 1, wherein said selecting step comprises the step of detecting said second portion of said gesture moving over said at least one second content item.

4. The method according to claim 1, further comprising the step of:
    while said first content item and said at least one second content item are selected, detecting a third portion of said gesture for performing a predetermined operation on said first content item and at least one second content item.

5. The method according to claim 1, wherein each said content item has a time parameter associated thereto and displayed on said display, said list of selectable content items is sorted in a chronological order based on said time parameters.

6. A method comprising:
    displaying a list of content items scrollable along a first direction on a display of a computing device wherein a plurality of content items in said list of content items is selected, each said content item comprises a parameter value in a parameter field;
    detecting a multi-input gesture relative to said plurality of selected content items;
    determining a direction and a displacement of each input of said multi-input gesture; and
    changing each said parameter value of said plurality of selected content items by an amount of change determined based on said direction and said displacement of each input of said multi-input gesture.

7. The method according to claim 6, wherein said direction of movement of each input of said multi-input gesture is substantially parallel to each other, and wherein said amount of change of said plurality of selected content items is identical and proportional to an average displacement of each input of said multi-input gesture.

8. The method according to claim 6, wherein said multi-input gesture is a spread gesture where each input of said multi-input gesture moves away from each other, said amount of change of said plurality of selected content items is determined such that a difference between adjacent selected content items increases across all selected content items.

9. The method according to claim 6, wherein said multi-input gesture is a pinch gesture where each input of said multi-input gesture moves towards each other, said amount of change of said plurality of selected content items is determined such that a difference between adjacent selected content items decreases across all selected content items.

10. A tangible non-transitory computer-readable storage medium storing computer-readable instructions, wherein when said computer-readable instructions are executed by a computing device, cause the device to:
    display a list of content items scrollable along a first direction on a display of said computing device;
    detect a first portion of a gesture selecting a first content item in said list of content items;

while said first content item is selected, detect a trigger for a second portion of said gesture; and select at least one second content item in said list of content items in response to said second portion of said gesture;

wherein said trigger for said second portion of said gesture is a scroll gesture along said first direction, and wherein scrolling of said list of content items is disabled while said first content item is selected.

11. The computer-readable storage medium of claim 10, wherein said first portion of said gesture is a drag in a direction substantially orthogonal to said first direction.

12. The computer-readable storage medium of claim 10, wherein said selecting step comprises the step of detecting said second portion of said gesture moving over said at least one second content item.

13. The computer-readable storage medium of claim 10, wherein said computer-readable instructions further cause the device to:

while said first content item and said at least one second content item are selected, detecting a third portion of said gesture for performing a predetermined operation on said first content item and at least one second content item.

14. The computer-readable storage medium of claim 10, wherein each said content item has a time parameter associated thereto and displayed on said display, said list of selectable content items is sorted in a chronological order based on said time parameters.

* * * * *